(12) United States Patent
Wall et al.

(10) Patent No.: US 7,934,743 B1
(45) Date of Patent: May 3, 2011

(54) CONVERTOR DOLLY WITH SELF STEERING

(76) Inventors: Roy Wall, Hamilton, MT (US); Tonja Wall, Hamilton, MT (US)

( * ) Notice: Subject to any disclaimer, the term of this patent is extended or adjusted under 35 U.S.C. 154(b) by 0 days.

(21) Appl. No.: 12/368,944

(22) Filed: Feb. 10, 2009

Related U.S. Application Data

(60) Provisional application No. 61/027,485, filed on Feb. 10, 2008.

(51) Int. Cl.
*B62D 53/08* (2006.01)

(52) U.S. Cl. .................................................. 280/476.1
(58) Field of Classification Search ............... 280/476.1
See application file for complete search history.

(56) References Cited

U.S. PATENT DOCUMENTS

| | | | | |
|---|---|---|---|---|
| 3,482,853 A | * | 12/1969 | Raidel | 280/124.174 |
| 5,407,221 A | * | 4/1995 | Haire et al. | 280/476.1 |
| 5,474,320 A | * | 12/1995 | Bojarski et al. | 280/5.521 |
| 6,733,028 B2 | * | 5/2004 | Teeple | 280/476.1 |
| 6,820,887 B1 | * | 11/2004 | Riggle | 280/476.1 |

* cited by examiner

*Primary Examiner* — Tony H. Winner
(74) *Attorney, Agent, or Firm* — Gary Hoenig

(57) ABSTRACT

An apparatus for facilitating trailer towing is provided comprising a steer axle fixed to a rigid frame by means of a suspension, a selectably adjustable hitch, for receiving a trailer tongue, mounted on the frame and positioned above and forward of the steer axle, a vertically displacing articulated and spring centered tongue support fixed to the front of the frame, the vertically displacing articulated tongue support capable of absorbing vertical displacement between the apparatus and a towing vehicle while maintaining the a forward disposed tongue mount in a horizontal position. The apparatus forms a towing apparatus providing improved stability, traction, control, and maneuverability facilitating wheel traction at speed, through turns and over irregular or undulating terrain. The apparatus is particularly suitable for use in combination with light weight prime mover vehicles.

12 Claims, 9 Drawing Sheets

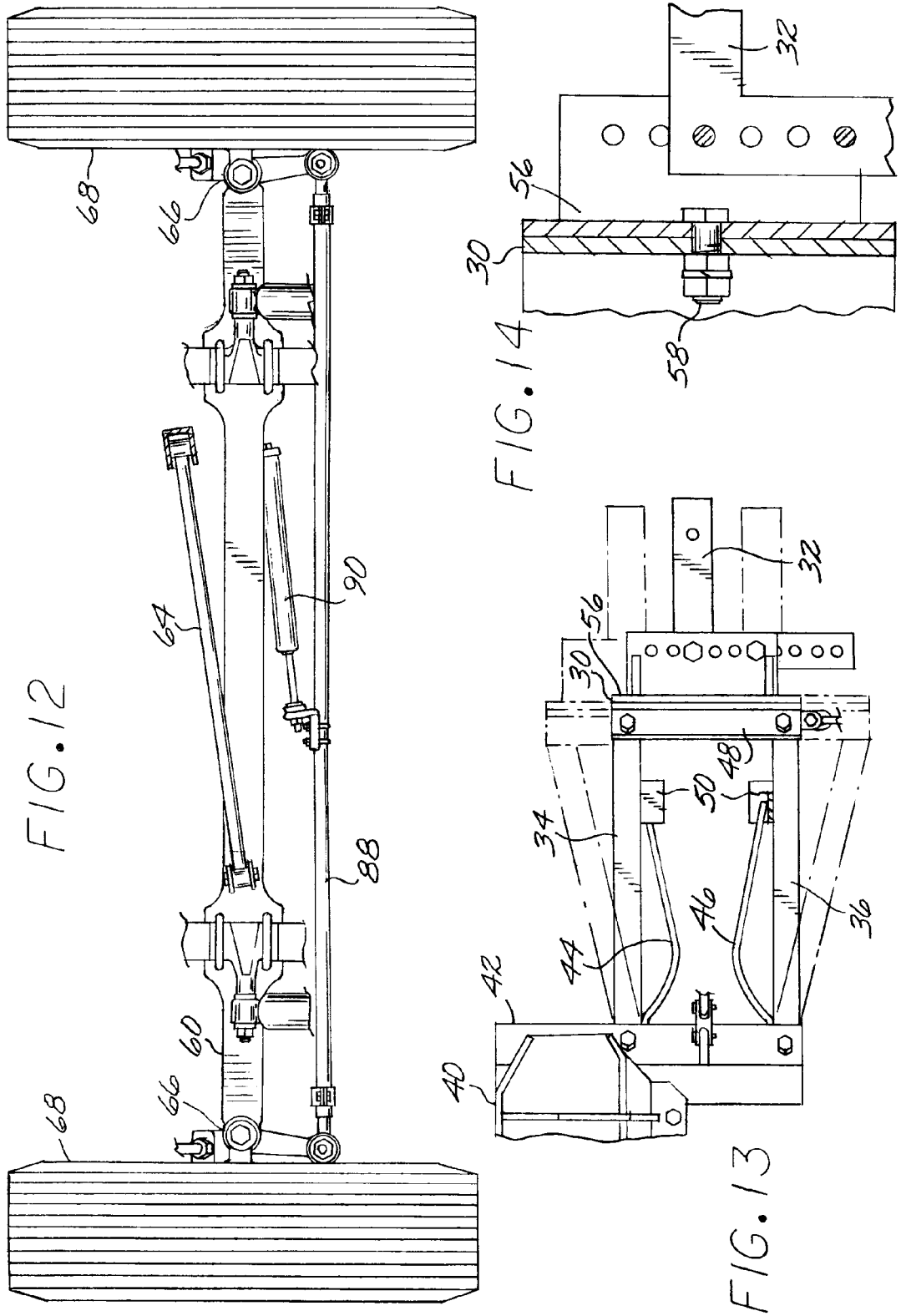

CONVERTOR DOLLY WITH SELF STEERING

FIELD OF INVENTION

The present invention generally relates to the field of towing dollies; and, more particularly, to a convertor dolly with a self steering mechanism for adapting trailers for towing behind a prime mover.

BACKGROUND OF THE INVENTION

Vehicles used for hauling trailers must be capable of sustaining the axle load of the trailer and capable of accommodating the type of hitch provided by the trailer. Further, the towing a trailer can restrict the maneuvering of the combined vehicle and trailer particularly while backing up. The vehicle and trailer combination typically also presents tracking and traction issues. The prior art provides a number of attempts to overcome these difficulties. A common method is to incorporate a convertor dolly which provides at least one axle, a specific type of hitch suitable for accommodating the trailer to be towed, and a tongue for attachment to the prime mover vehicle. The convertor dolly reduces the axle load of the prime mover vehicle and facilitates the prime mover vehicle to provide principally a pulling force. Convertor dollies are arranged such that the dolly functions as an extension of the rear of the prime mover vehicle such that the convertor dolly typically does not rotate or pivot around the prime mover tow point thereby keeping the frame of the dolly and hence the alignment of wheels of the dolly fixed in the direction of the rear of the prime mover vehicle. Prior art convertor dollies have several distinct disadvantages in that the combined trailer, dolly, and prime mover vehicle is difficult to reverse and that the dolly wheels are fixed in the forward position matching the rear wheels of the prime mover vehicle. Because the wheels of a typical convertor dolly do not turn in a steering motion, the combined prime mover vehicle rear wheels and the dolly wheels necessarily bind against the pavement during turning maneuvers thereby reducing control, traction, and stability during turning. Similarly, reversing maneuvers are particularly difficult with prior art convertor dollies because the dolly wheels are not steerable thereby making turning maneuvers while backing up almost impossible.

Further, prior art convertor dollies have fixed hitch types for accommodating a specific type of trailer hitch. The fixed hitch types are typically fixed in position relative to the dolly axle thereby limited the adjustability the load on the prime mover vehicle rear axle.

Traction is essential for full maneuvering control. The combination prime mover and dolly are rigidly fixed together, in part, so that when in combination with a trailer there is no double articulation of the assembly. A disadvantage of this arrangement is that the prime mover and dolly assembly can be long. The length becomes important when considering the effect on the assembly when traveling over non-level undulating surfaces. As the combination has a least three axles and the frames are fixed relative to each other, traction can be lost on an axle as it is lifted away from a road surface by the other axles.

What is needed is an improved convertor dolly capable of providing steering tracking of the dolly wheels in response to the prime mover vehicle turning maneuvers thereby providing improved handling, traction, and maneuverability and being of particular importance to permit backup maneuverability while also providing the ability to adapt a variety of trailer hitch types for hauling.

SUMMARY OF THE INVENTION

Accordingly, the present invention is directed to a new type of trailer dolly, and, more specifically, to a trailer dolly incorporating a steering axle and an articulating and selectably adjustable tongue support providing improved stability, control, and maneuverability, thereby substantially obviating one or more of the problems due to the limitations and disadvantages of the related art.

The present invention is a trailer dolly comprising a steer axle and an articulating frame construction. The frame is comprising a rectangular frame constructed of I-beams positioned vertically such that the I-beam top and bottom flanges are parallel to the ground. A pair of leaf type suspension springs are mounted to the left and right forward and left and right rear portions of the I-beam frame each being rotatably mounted to a forward mount and rotatably mounted to a first end of a suspension link being, in turn, rotatably mounted to the I-beam frame near the rear of the frame. A steer axle is centrally mounted to the leaf type spring suspension centrally to the bottom of the left and right leaf springs. A pair of shock absorbers are mounted respectively on the left and right sides of the I-beam frame at the proximate end and the distal end is mounted to the steer axle so as to provide dampening of the leaf type spring suspension. The steer axle is a commercially available assembly having an forged axle frame and two wheel assemblies rotatable from left to right around a pin and mounted to each end of the forged axle frame, a configuration well known in the prior art. A steering tie rod is pivotably mounted to tie rods extending from each wheel assembly thereby forcing the wheel assemblies to turn or steer relative to frame in unison. A steering shock absorber is rotatably fixed at one end to the axle frame and the other end is rotatably fixed to the steering tie rod thereby damping side to side motion of the steering tie rod. Finally, a stabilizer bar is provided mounted at one end near one mounting point of the forged axle frame and the leaf type spring suspension and the I-beam frame for purposes of stabilizing side to side thrust of the steer axle since the steer axle is mounted to the I-beam frame by means of the leaf type spring suspension which would allow side to side movement relative to the I-beam frame if otherwise not stabilized.

The left and right sides of the I-beam frame extend beyond the front element of the I-beam frame to support two downwardly fixed square tubular elements being welded at an angle to form the rear portion of a rhombic shaped tongue support frame having rear, front, top and bottom structural portions, wherein all four corners of the tongue support frame are pivotably attached so as to allow the tongue frames to articulate upwardly and downwardly. The forward portions of the tongue support frames are welded to a tongue mount plate thereby allowing the tongue plate to move upwardly and downwardly. The tongue support frames each further comprise an upper and lower leaf spring wherein each leaf spring is attached respectively to the top and bottom frame members to centralize the tongue support frame while permitting upward and downward movement of the tongue being attached to a tongue support which in turn is centrally and rotatably bolted to the tongue mount bracket.

In combination, the articulating tongue support frame and the rotatable tongue support facilitating even load distribution between the dolly wheels while the steer axle permits the wheels to turn from side to side in response to the maneuvering of the prime mover vehicle thereby eliminating the wheels from binding on the pavement hence enhancing maneuverability and stability. The articulating tongue support permits both the prime mover vehicle axles and the dolly axle to maintain road contact over undulating surfaces. Further the self steering wheels allow improved steering particularly during reversing maneuvers.

BRIEF DESCRIPTION OF THE DRAWINGS

The accompanying drawings, which are incorporated in and constitute a part of this specification illustrate embodiments of the invention and, together with the description, serve to explain the features, advantages, and principles of the invention.

In the drawings:

FIG. 12 is a top plan view of the steering axle assembly according to the present invention.

FIG. 13 is a left side elevation view of the articulating tongue support illustrating the limits of upward and downward motion of the support and the articulating tongue support being driven to a neutral position by leaf type springs.

FIG. 14 is a cross section view of the tongue mount with the tongue shown pinned to the tongue mount illustrating the selectable positioning of the tongue.

DETAILED DESCRIPTION OF THE PREFERRED EMBODIMENT

Figure 1:
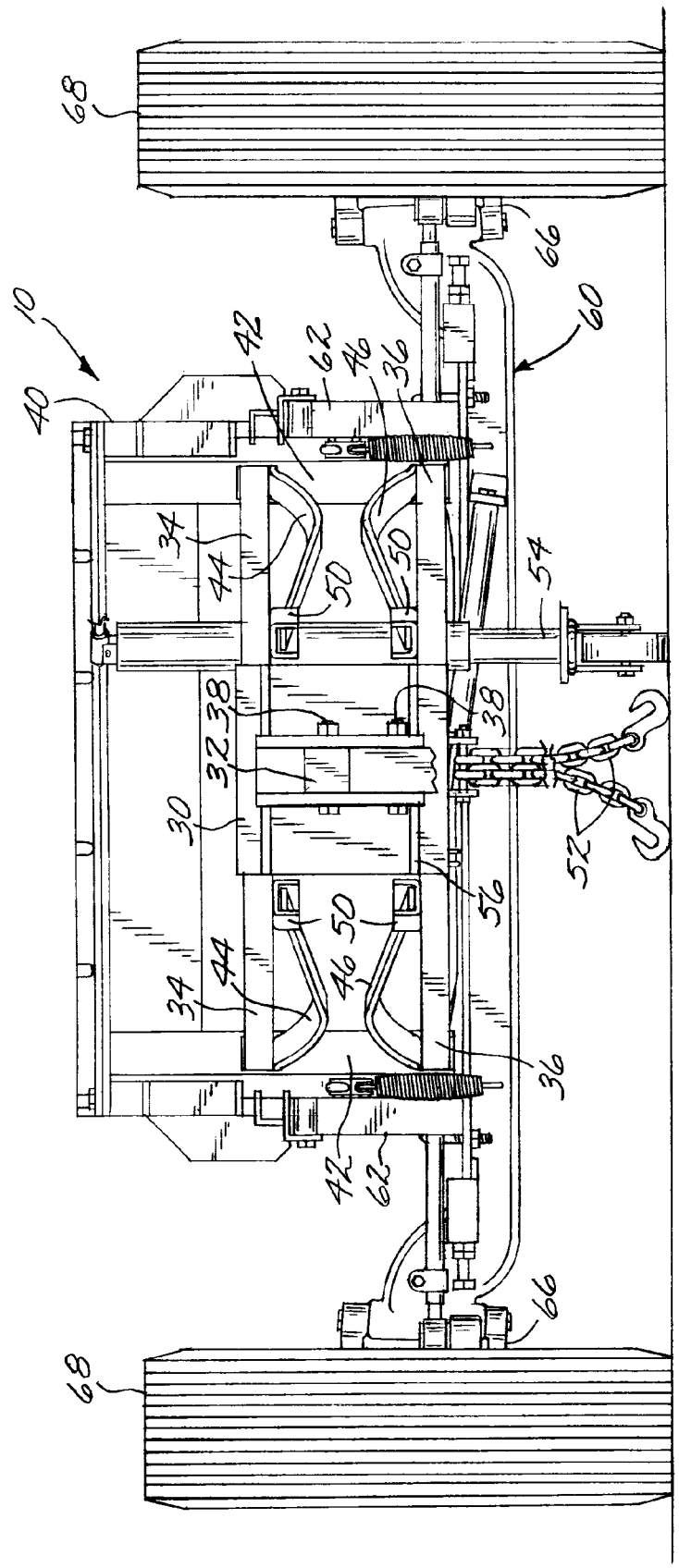
FIG. 1 is a front elevation view of the trailer dolly with steering axle according to the present invention showing the dolly supported by the dolly stand.

Although particular embodiments of the invention have been described in detail for purposes of illustration, various modifications may be made without departing from the spirit and scope of the invention. Accordingly, the invention is not to be limited except as by the appended claims. Referring now in greater detail to the various figures of the drawings wherein like reference characters refer to like parts, there is shown in a perspective view at 10 in FIG. 1, a new type of convertor dolly having a steering axle, adjustable hitch mount, selectable hitch receiver types, adjustable tongue height and articulating tongue support facilitating high maneuverability and stability particularly suitable for use in combination with light weight prime mover vehicles to haul various types of trailers having various types of hitches.

The front elevation view of the present invention shown at 10 in FIG. 1, showing details of the tongue mount plate 30, tongue support 56, tongue 32, and the upper 34 and lower 36 members of the articulating tongue support frame assembly with the tongue 32 being fastened by bolts 38 to the tongue support 56 which, in turn is centrally bolted to the tongue mount plate 30. The articulating tongue support assembly is comprising two tongue support frames each being formed from a vertically mounted square tubular steel rear member 42 welded at angle to forward extensions of the steel I-Beam dolly frame 40. The rear members have an opening to accommodate the pivotably attached top members 34. Similarly the rear members 42 have an opening to accommodate the similarly pivotably attached bottom frame members 36. The forward opposing ends of the top 34 and bottom 36 members of the tongue support frame are similarly pivotably attached to similar vertically mounted square tubular front members 48, see FIG. 3, forming the front portion of each tongue support frame and each welded at angle so as to converge to the centrally located tongue mount plate 30 which forms the front of the articulating tongue support assembly thereby providing an upwardly and downwardly articulation of the tongue mount plate 30 relative to the I-Beam dolly frame 40. The tongue support 56, bettered viewed in FIG. 14, being centrally bolted to the tongue mount plate 30, may rotate thereby permitting accommodating rotation around the central axis of the dolly relative to the prime mover vehicle while maneuvering over irregular surfaces.

Still referring to FIG. 1, the tongue support assembly being articulated is centralized to a neutral vertical position by upper 44 and lower 46 centering leaf springs being respectively mounted on each top 34 and bottom 36 member of each tongue support frame. As the tongue mount plate 30 moves relative to the I-Beam dolly frame 40 that the upper centering leaf springs 44 are designed to compress as the tongue support moves downward while the lower center leaf springs 46 compress as the tongue support 30 moves upward relative to the frame 40. Consequently, the each leaf spring is contained by the frame spring mounts 50 mounted on the top 34 and lower 36 frame members, having an opening and a bottom in which the leaf spring rests without being securely fastened in place thereby restraining the leaf spring end only when the spring compresses. The action of the articulating tongue support assembly is shown in FIG. 13.

Safety chains 52 are provided, as required by regulation, being attached to the tongue support 30 as shown in FIG. 1. Also provided is support stand 54, welded to the i-beam frame 40, for convenience of storage, hitching and positioning during the assembly of the dolly 10, according to the present invention, with a trailer and prime mover vehicle.

Figure 2:
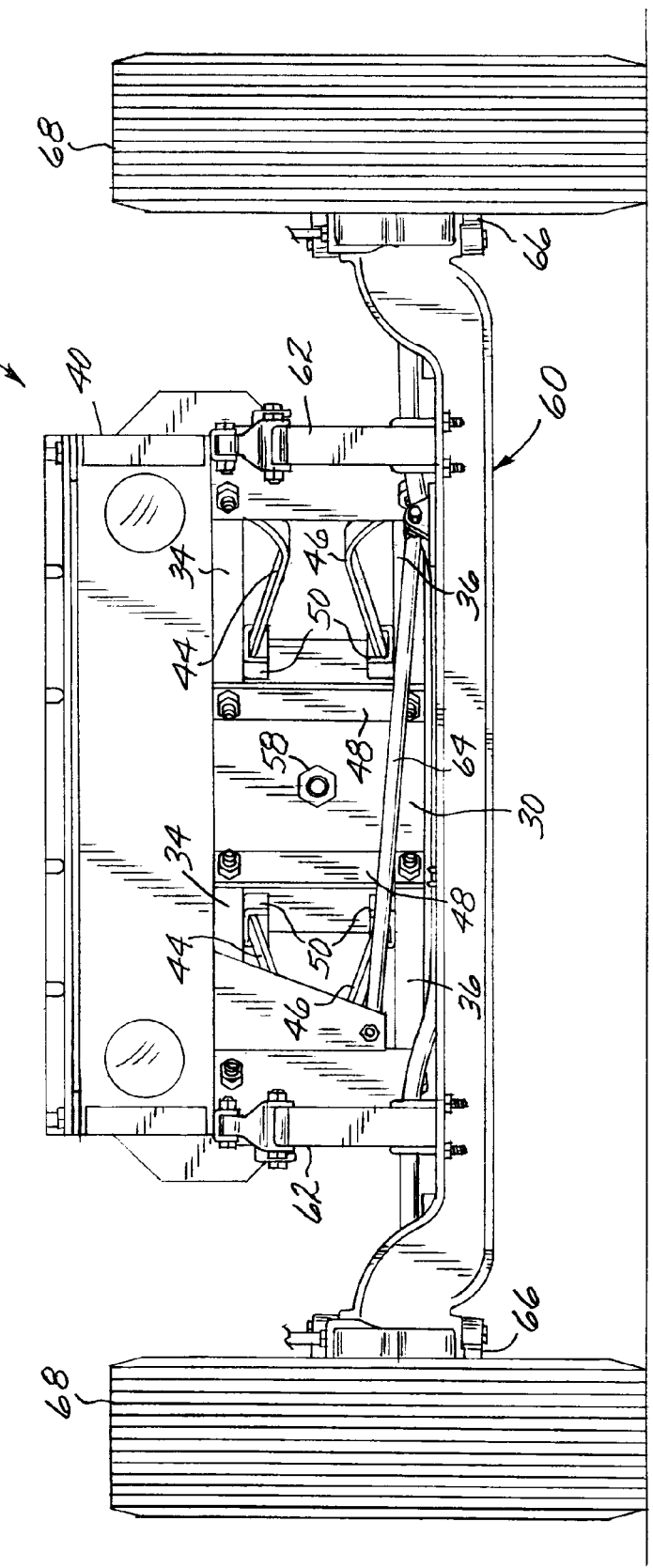
FIG. 2 is a rear elevation view of the present invention illustrated in FIG. 1, wherein the steering axle is clearly seen mounted to the bottom of the leaf type spring suspension.

Referring now to FIG. 2, a rear elevation view according to the present invention, where the tongue support frame front members 48 can be seen welded at a converging angle to the tongue mount plate 30 with the rear of the tongue mounting bolt 58 which secures the tongue support to the front of the tongue mount plate 30. Also visible is the steer axle assembly 60 mounted to the dolly i-beam frame 40 by means of the leaf spring suspension 62 on the left and right sides of the frame. The steer axle assembly is commonly available from manufacturers such as Dana. The steer axle assembly further includes a stabilizing bar 64 for containing side to side motion of the steer axle assembly relative to the i-beam dolly frame 40. The steer axle assembly provides wheel hubs that are capable of turning from side to side. As detailed in FIG. 12, the wheel hubs 66 are linked to each other with a steering connector rod 88 such that the turning angle of one wheel tracks the turning angle of the other. A steering stabilizer shock absorber 90 is provided between the steering connector rod 88 and the steering axle frame. The appropriate tires 68 are selected for a required load application.

Figure 3:
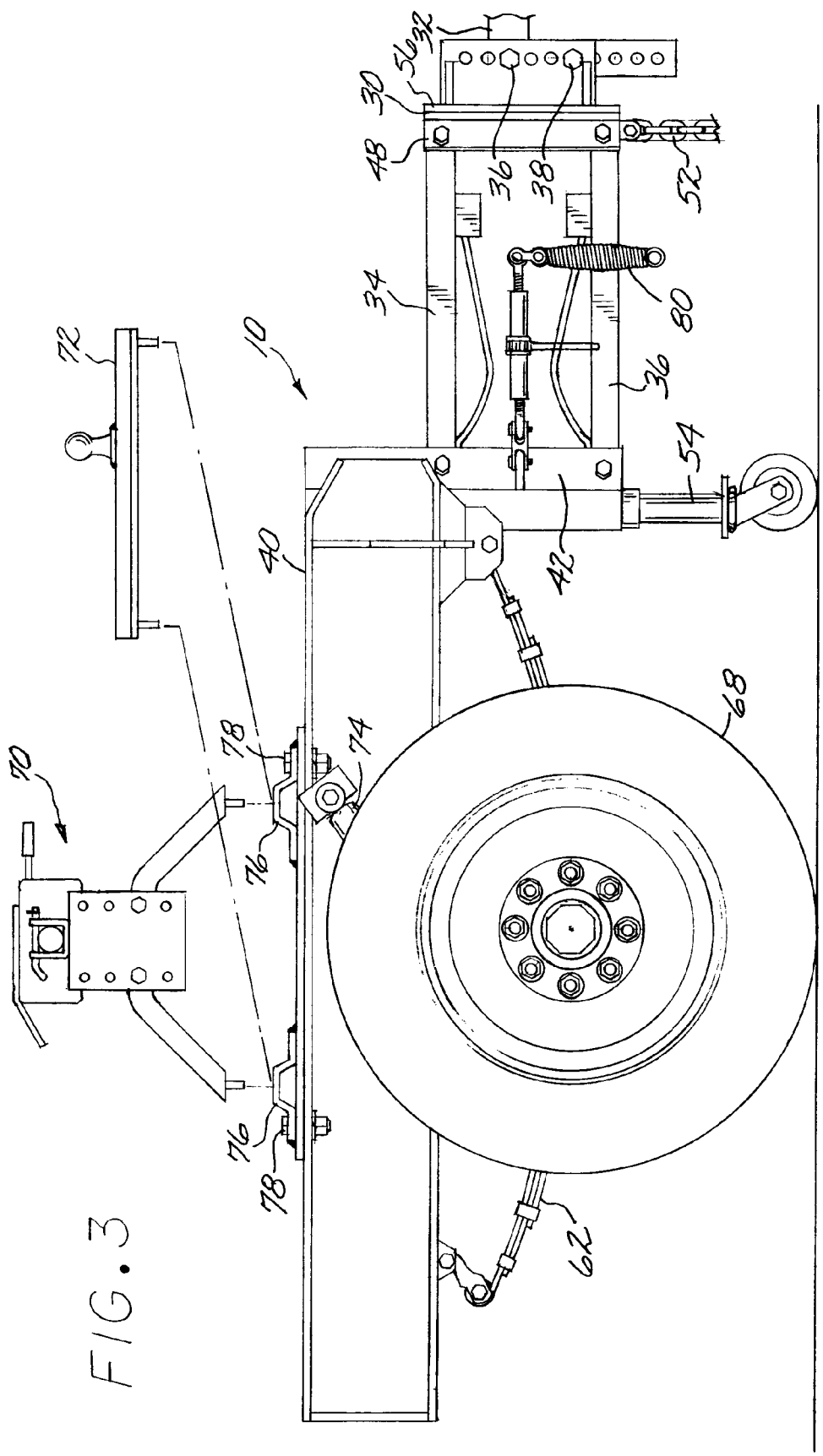
FIG. 3 is a right side elevation view of the present invention of FIG. 1 resting on the dolly stand and illustrating the fifth wheel and goose-neck hitch options.

In FIG. 3, a left side elevation view, the i-beam dolly frame 40 is constructed from for i-beams forming the front, rear, left and right sides of the frame 40. The chassis leaf springs 62 are mounted along each bottom of the left and right sides of the frame 40 using conventional pin and link rotational mountings commonly used in leaf spring suspensions. Upward and downward motion of the steer axle relative to the frame is dampened with shock absorbers 74 mounted to each side of the frame and to the steer axle. The tops of the left and right sides of the frame 40 have mounting holes to accommodate hitch mount brackets 76 which are mounted at one end on the left and the opposing end on the right sides of the frame 40 with bolt fasteners 78. Various hitch types such as a gooseneck hitch 72 or a fifth wheeler hitch 70 are accommodated by the hitch mount brackets 76. It will be appreciated that the hitch may be positioned forward or backward along the frame 40 so as to optimize the load transferred to the tongue.

Details of the articulating tongue support assembly are visible in FIG. 3 showing the rear 42, top 34, bottom 36, front 48 members of the tongue support frame, wherein the front members 48 are welded to the tongue mount plate 30. Tongue support 56 is bolted to the tongue mount plate 30 and has a receiver portion for attaching the tongue 32 by means of bolts 38. Depending upon the tire 68 size, the dolly support 54 is adjustable to position the dolly 10 level for loading and attachment. Note that lateral cinches 80 are provided to cinch the rear members of the tongue support assembly to the prime mover vehicle so as to prevent the dolly 10 from swaying side to side relative to the prime mover vehicle. The cinching allows the dolly 10 to be a relatively rigid extension of the rear of the prime mover vehicle.

Figure 4:
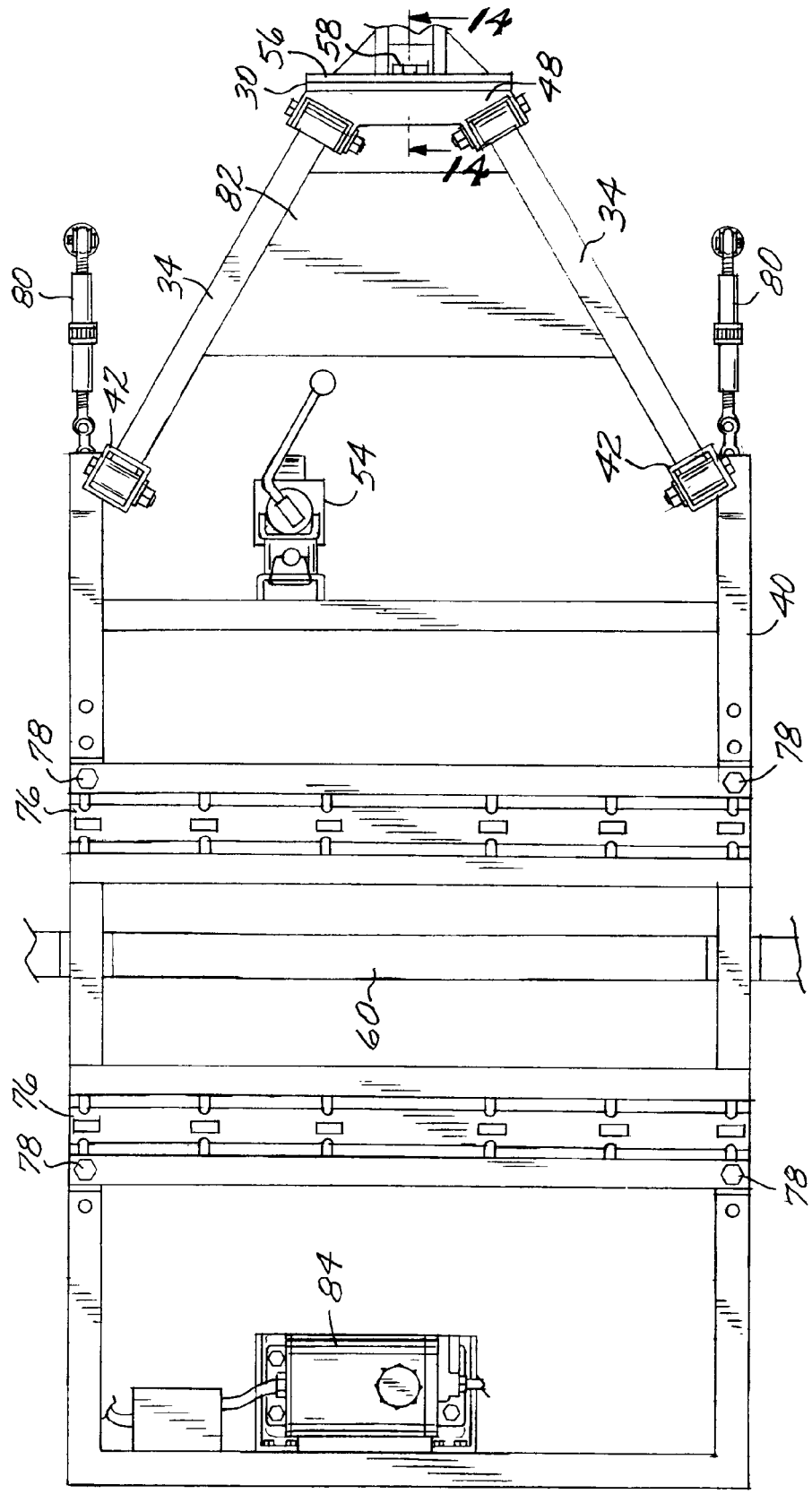
FIG. 4 is a top plan view the trailer dolly according to the present invention.
Figure 5:
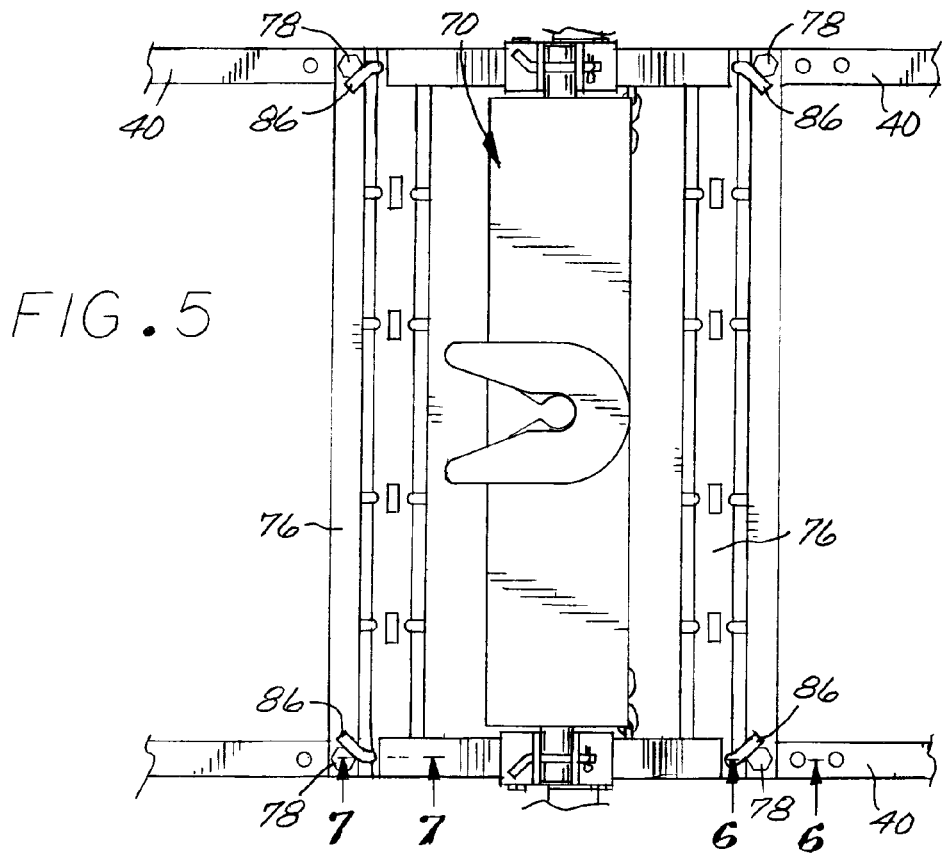
FIG. 5 is top view of the hitch portion according to the present invention showing the removable fifth wheel hitch in position.
Figure 6:
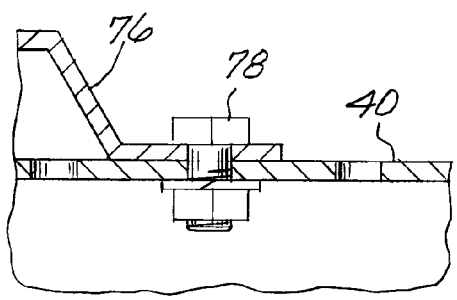
FIG. 6 is a cross section view of an attachment point of the repositionable hitch mount brackets mounted to the top of the I-beam frame.
Figure 7:
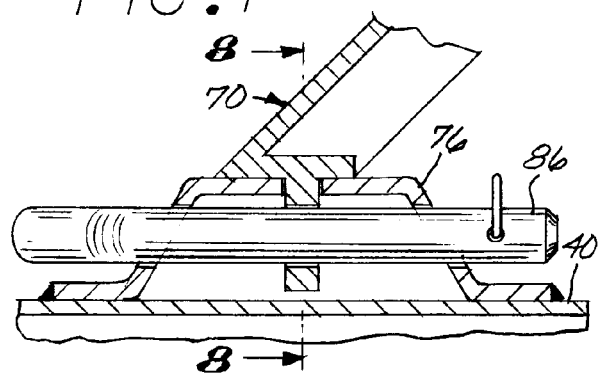
FIG. 7 is a cross section view of an attachment point of an optional removable hitch to a repositionable hitch mount bracket showing a hitch securing pin in position through the hitch mount bracket and through a mounting hole in the removable hitch.
Figure 8:
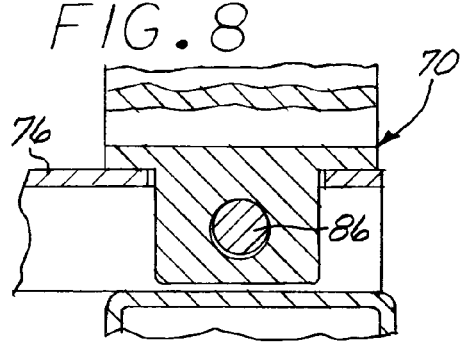
FIG. 8 is a cross section view, similar to FIG. 7, showing details of the hitch securing pin in the mounting hole of the removable hitch.

FIG. 4, a top plan view, illustrates the attachment of the hitch mount brackets 76 to the frame 40 by means of bolts 78. A clear view of the tongue support frame shows the support rear frame member 42 rotatably attached to the top member 34 and front members 48 and tongue mount plate 30. Tongue mount bolt 58 through the tongue support 56 is also visible.

An optional tongue support frame stiffener 82 is welded between the top members 34. The lateral cinches 80 are positioned on each side of the frame. The dolly stand 54 is attached to the front of the dolly i-beam frame 40. The electric over hydraulic brake system 84, as required by regulation for this type of apparatus, is mounted at the rear of the frame 40.

A fifth wheeler hitch assembly 70 is illustrated in FIGS. 5, 6, 7 and 8 being attached to the top of the dolly frame 40. In the illustrated configuration the hitch mounting brackets 76 are mounted to the frame 40 with bolts 78 to accommodate the spacing requirement of the hitch 70 so as to position the hitch relative to the axle such that a selected load is maintained on the tongue. The hitch 70 is attached to the hitch mounting brackets 76 by means of removable pins 86 inserted at all four corners of the hitch 70. The hitch as tabs directed downwardly to fit openings in the hitch mounting brackets 76 and with a hole to receive pins 86. The hitch mounting bracket 76 further has holes to receive pins 86 such that when the hitch tabs are positioned into the bracket 76, the pins 86 slide through the hitch mounting bracket on one side, the hole in the hitch tab and then through the hitch mounting bracket on the other side thereby removably securing the hitch to the dolly.

Figure 9:
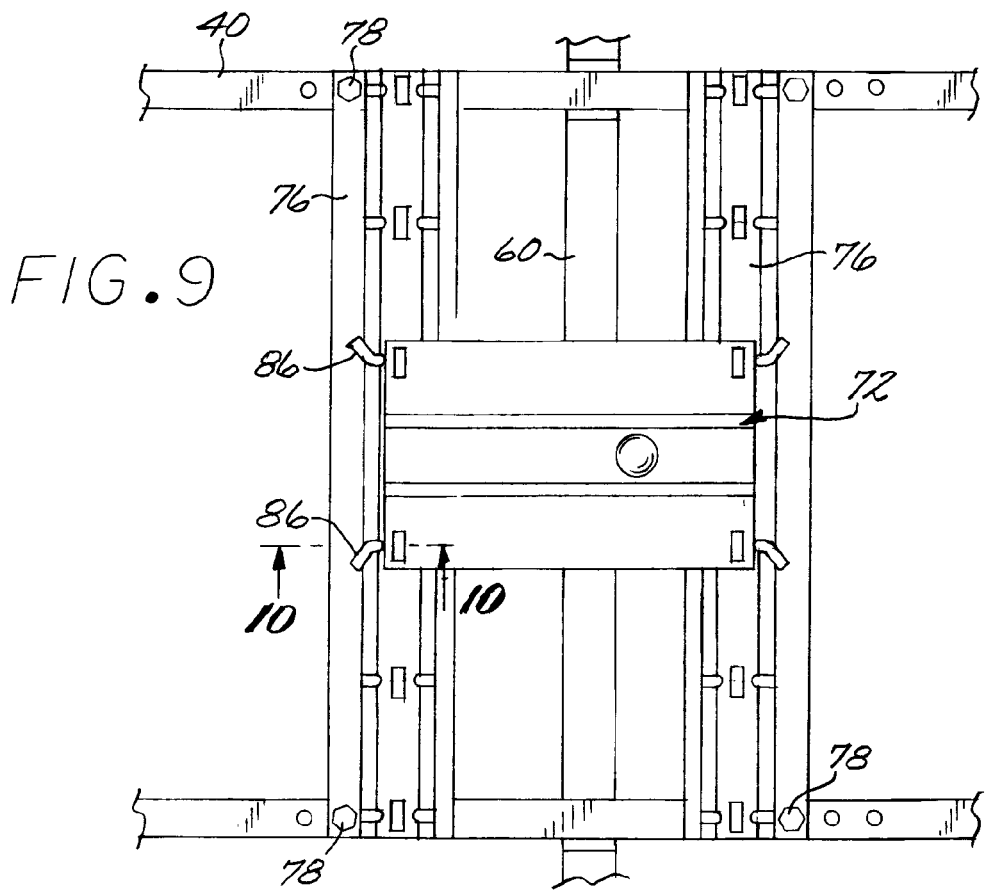
FIG. 9, similar to FIG. 5, is top view of the hitch portion according to the present invention showing the removable alternate goose-neck hitch in position.
Figure 10:
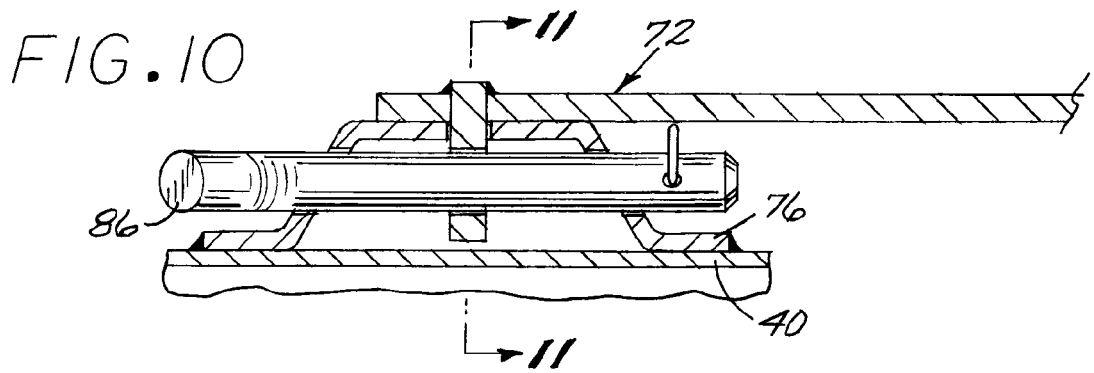
FIG. 10, similar to FIG. 6, is a cross section view of an attachment point of the repositionable hitch mount brackets mounted to the top of the I-beam frame illustrating how the removable hitches are attached in an identical fashion.
Figure 11:
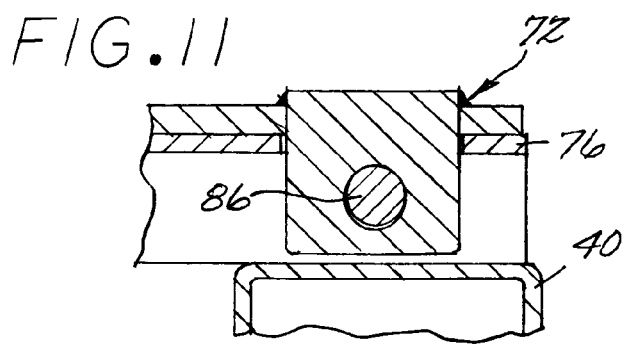
FIG. 11, similar to FIG. 7, is a cross section view of an attachment point of the optional removable goose-neck hitch, of FIG. 9, to a repositionable hitch mount bracket showing a hitch securing pin in position through the hitch mount bracket and through a mounting hole in the removable hitch illustrating the consistent fastener system.

Referring to FIGS. 9, 10, and 11, showing a goose-neck type hitch 72 similarly and removably attached to the frame 40 wherein the fittings and attachments illustrated in the Figures are the same as those used with the fifth wheeler hitch excepting the hitch 72. The goose-neck type hitch does not require the width of the fifth wheel hitch to mount and as such holes for the hitch tabs and pins are provided in the appropriate locations.

Figure 15:
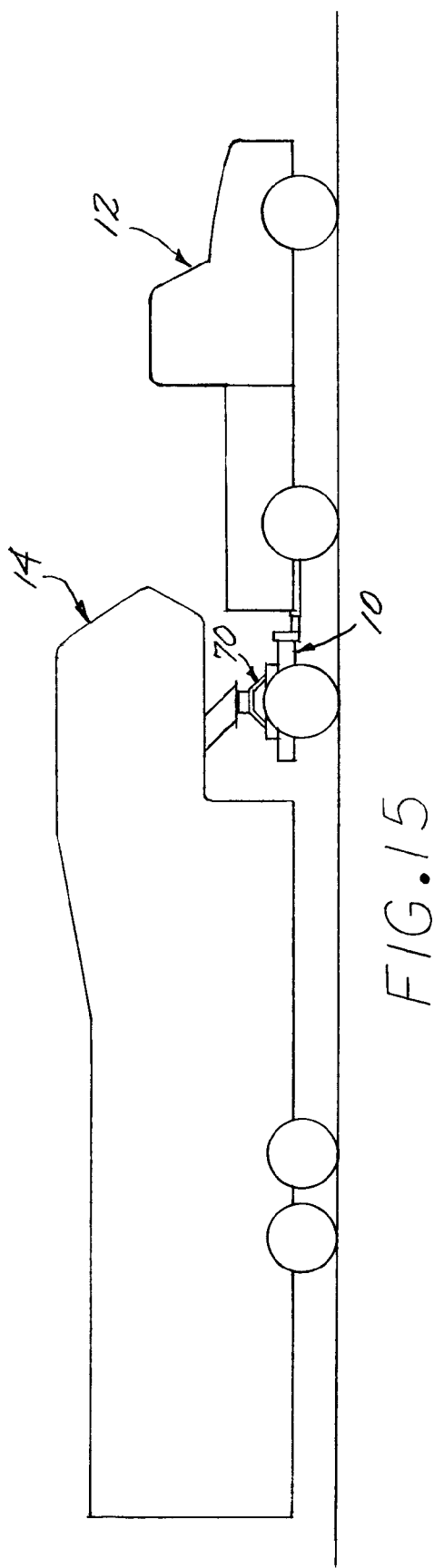
FIG. 15 is a side elevation view of a prime mover vehicle utilizing the convertor dolly according to the present invention with a fifth wheeler type hitch and trailer attached.
Figure 16:
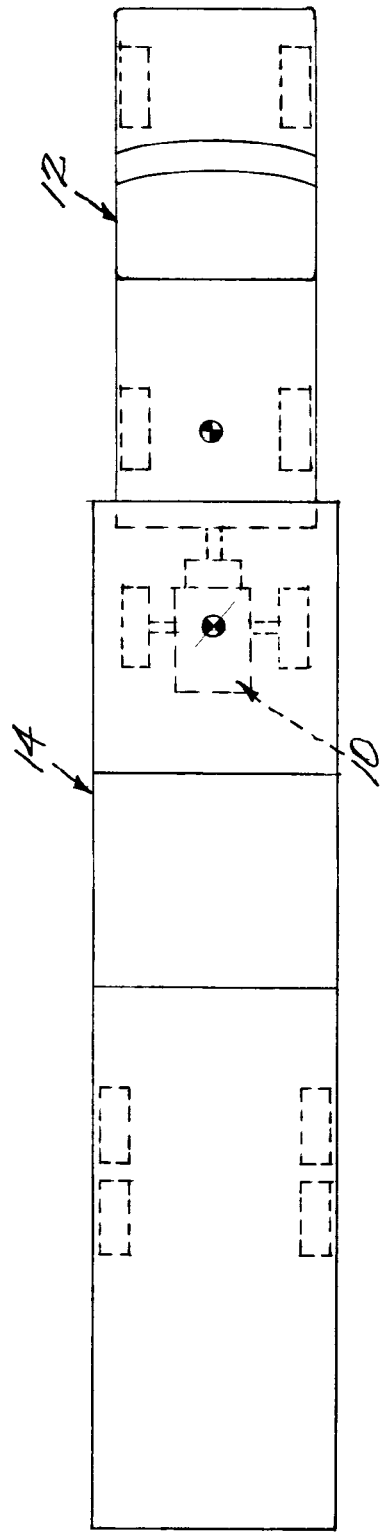
FIG. 16 is a top plan view of the vehicle, dolly and trailer combination of FIG. 15, wherein the wheel positioning is illustrated when traveling straight forward.
Figure 17:
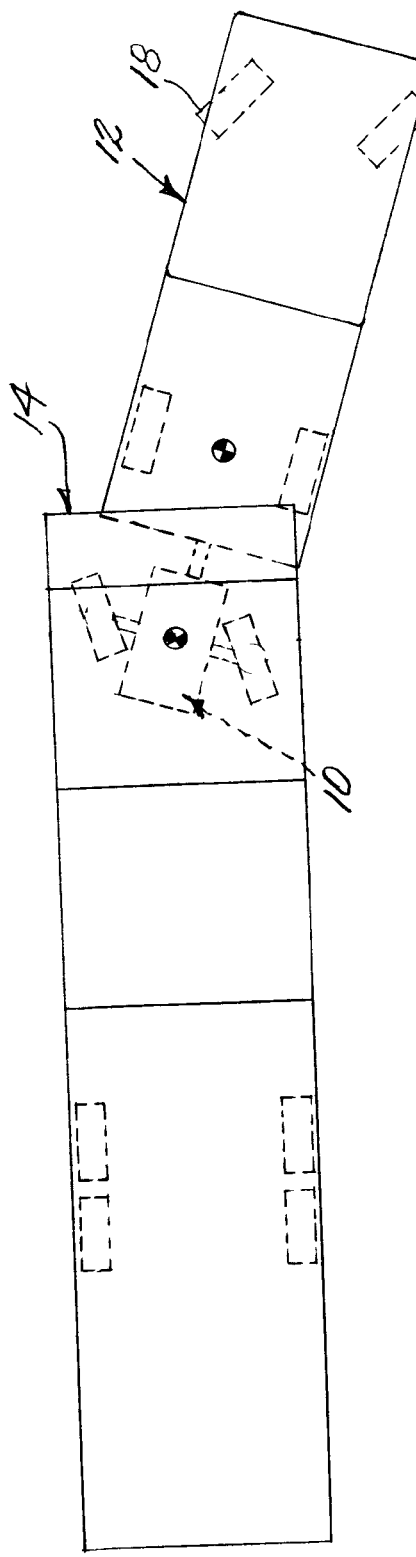
FIG. 17 is a top plan view, similar to FIG. 16, wherein the wheel position is illustrated when the combination rig is maneuvering a turn.

FIG. 15 illustrates the assembled combination of the prime mover vehicle 12, dolly 10 with a fifth wheeler type hitch 70, and a fifth wheeler trailer 14. Note in FIG. 16, a top plan view, that the dolly wheels are aligned with the rear and front wheels of the prime mover vehicle. While in FIG. 17, the dolly wheels turn to the left in response to a right turn maneuver of the prime mover vehicle 12 as illustrated by the turning angle of the vehicle steer wheels 18. The left turning of the dolly wheels is in response to the side force induced because the dolly does not pivot with the rear of the vehicle consequently allowing the dolly to maintain stability without the tires binding on the pavement. This turning also permits the combination to be maneuvered backward. If the wheels did not turn, then the trailer is forced to remain in line with the vehicle thereby complicating reverse maneuvers.

Figure 18:
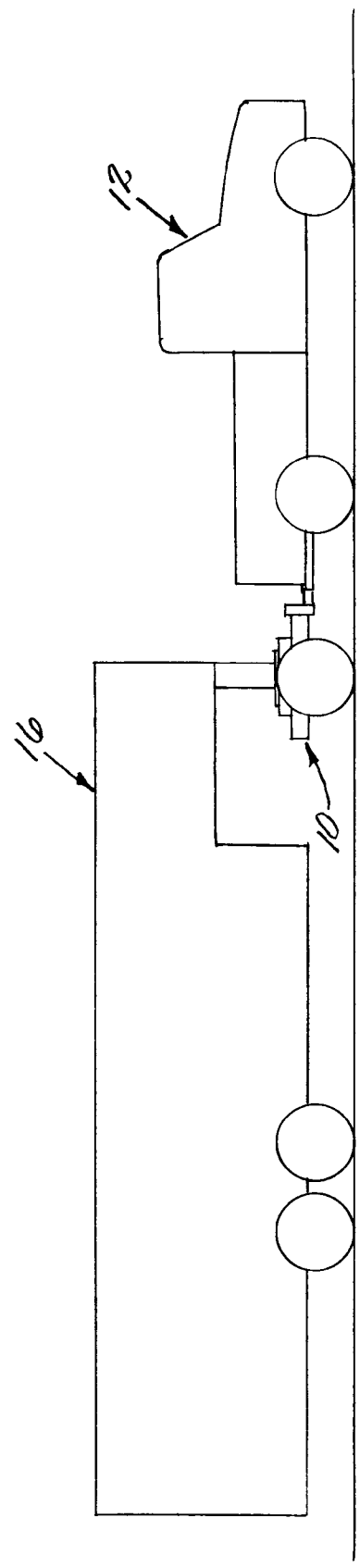
FIG. 18 is a side elevation view of a prime mover vehicle utilizing the convertor dolly according to the present invention with a goose-neck type hitch and trailer attached.

FIG. 18 illustrates the assembled combination of the prime mover vehicle 12 and dolly 10 with a goose-neck type trailer 16. Of particular notice is the configurability of the dolly components to provide adjustability of the goose-neck hitch position relative to the dolly axle position.

What is claimed is:

1. A trailer convertor dolly comprising,
a rectangular frame having a front, rear, top and bottom,
a steer axle mounted by means of a leaf spring suspension to the bottom of the frame,
a hitch removably mounted to the top of the frame,
an articulated tongue support assembly providing vertical displacement having two tongue support frames each being formed from a vertically mounted rear member, a top member pivotably attached to the rear member and a bottom member pivotably attached to the rear member and a front portion pivotably receiving the top and bottom members, an upper and a lower centering leaf spring mounted on each top and bottom member each further being attached to the rear member and received respectively by a spring mount on the top and bottom members, the front portions being welded to a tongue mount plate, a tongue support plate rotatably attached to the tongue mount plate of the tongue support assembly by a tongue mount bolt and having a tongue receiver portion; and a tongue adjustably mounted to the tongue receiver of the tongue support plate.

2. The trailer convertor dolly of claim 1 wherein an attachment of the tongue to tongue receiver portion of the tongue support plate is vertically adjustable.

3. The trailer convertor dolly of claim 1 wherein the rectangular frame is constructed of steel i-beam.

4. The trailer convertor dolly of claim 1 wherein the hitch is adjustably mounted along the top of the frame and forward of the steer axle.

5. The trailer convertor dolly of claim 1 wherein the upper centering leaf springs are disposed to compress when the tongue is displaced upward from a center position relative to the rectangular frame.

6. The trailer convertor dolly of claim 1 wherein the lower centering leaf springs are disposed to compress when the tongue is displaced downward from a center position relative to the rectangular frame.

7. The trailer convertor dolly of claim 1 wherein the hitch has a fifth wheel trailer tongue receiver.

8. The trailer convertor dolly of claim 1 wherein the hitch has a goose-neck trailer tongue receiver.

9. The trailer convertor dolly of claim 1 further comprising an electric over hydraulic braking apparatus mounted to the rectangular frame and disposed to brake the wheels of the steer axle.

10. The trailer convertor dolly of claim 1 further comprising at least two lateral cinches each attached at one end to the rear member of the articulated tongue support assembly and the other end fixed to a prime mover vehicle so as to prevent side to side sway.

11. The trailer convertor dolly of claim 1 further comprising a support stand fixed to the frame and adjustable to position the dolly level for loading and attachment.

12. The trailer convertor dolly of claim 1 further comprising a safety chain attached to the tongue support.

* * * * *